US010550800B2

(12) United States Patent
Jayakar et al.

(10) Patent No.: US 10,550,800 B2
(45) Date of Patent: Feb. 4, 2020

(54) METHOD AND SYSTEMS FOR EXHAUST GAS RECIRCULATION

(71) Applicant: Transportation IP Holdings, LLC, Norwalk, CT (US)

(72) Inventors: Vijayaselvan Jayakar, Bangalore (IN); Amit Kumar Sharma, Bangalore (IN); Jennifer Anne Lachapelle, Erie, PA (US); Trideep Singh, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 152 days.

(21) Appl. No.: 15/296,556

(22) Filed: Oct. 18, 2016

(65) Prior Publication Data

US 2017/0037817 A1 Feb. 9, 2017

Related U.S. Application Data

(62) Division of application No. 14/178,350, filed on Feb. 12, 2014, now Pat. No. 9,476,388.

(51) Int. Cl.
*F02M 26/43* (2016.01)
*F02M 35/10* (2006.01)
(Continued)

(52) U.S. Cl.
CPC ............. *F02M 26/43* (2016.02); *F02B 75/20* (2013.01); *F02D 13/0215* (2013.01);
(Continued)

(58) Field of Classification Search
CPC ........... F02M 25/0749; F02M 25/0714; F02M 25/0743; F02M 25/0707; F02M 25/0704;
(Continued)

(56) References Cited

U.S. PATENT DOCUMENTS 6,293,246 B1 * 9/2001 Tanahashi ................ F01L 1/34
123/305
7,941,999 B2 * 5/2011 Kasper .................. F02M 26/39
123/568.11
(Continued)

FOREIGN PATENT DOCUMENTS

CN 1437680 A 8/2003
CN 103423036 A 12/2013
(Continued)

OTHER PUBLICATIONS

Machine translation, Detail Description of DE102004015108A1, Rehm et al., publ'n date: Oct. 20, 2005, obtained from https://worldwide.espacenet.com/, pp. 1-9.*
(Continued)

*Primary Examiner* — Grant Moubry
(74) *Attorney, Agent, or Firm* — McCoy Russell LLP (57) ABSTRACT

Various methods and systems are provided for reducing cylinder-to-cylinder variation in exhaust gas recirculation. In one embodiment, a system comprises a first cylinder group of an engine having a first number of cylinders, a second cylinder group of the engine having a second number of cylinders that is not an integer multiple of the first number of cylinders, and an exhaust system coupled to the first cylinder group and the second cylinder group. In at least one mode of operation, the exhaust system has exhaust ports of the first cylinder group fluidly coupled to an intake of the engine and exhaust ports of the second cylinder group fluidly decoupled from the intake.

16 Claims, 8 Drawing Sheets

(51) Int. Cl.

| | | |
|---|---|---|
| *F02B 75/20* | (2006.01) | |
| *F02D 41/00* | (2006.01) | |
| *F02D 13/02* | (2006.01) | |
| *F02D 21/08* | (2006.01) | |
| *F02M 26/05* | (2016.01) | |
| *F02M 26/01* | (2016.01) | |
| *F02M 26/17* | (2016.01) | |
| *F02M 26/22* | (2016.01) | |
| *F02M 35/12* | (2006.01) | |
| *F02M 26/37* | (2016.01) | |
| *F02B 75/18* | (2006.01) | |

(52) U.S. Cl.
CPC ......... *F02D 13/0265* (2013.01); *F02D 21/08* (2013.01); *F02D 41/006* (2013.01); *F02D 41/0052* (2013.01); *F02D 41/0065* (2013.01); *F02M 26/01* (2016.02); *F02M 26/05* (2016.02); *F02M 26/17* (2016.02); *F02M 26/22* (2016.02); *F02M 35/10295* (2013.01); *F02M 35/1233* (2013.01); *F02B 2075/1832* (2013.01); *F02D 41/0082* (2013.01); *F02M 26/37* (2016.02); *Y02T 10/47* (2013.01)

(58) Field of Classification Search
CPC ......... F02M 25/0711; F02M 35/10295; F02M 35/10222; F02M 26/11; F02M 26/43; F02M 26/37; F02M 26/05; F02D 41/0052; F02D 41/0065; F02D 21/08; F02D 13/0215; F02B 47/08; F02B 2075/1832
See application file for complete search history.

(56) References Cited

U.S. PATENT DOCUMENTS

| | | | | |
|---|---|---|---|---|
| 8,528,530 | B2* | 9/2013 | Freund | F02M 26/43 |
| | | | | 123/568.13 |
| 8,561,599 | B2* | 10/2013 | Gingrich | F02M 26/43 |
| | | | | 123/568.17 |
| 9,074,542 | B2* | 7/2015 | Henry | F02D 41/021 |
| 2012/0078492 | A1* | 3/2012 | Freund | F02D 41/0065 |
| | | | | 701/108 |
| 2012/0323470 | A1* | 12/2012 | Klingbeil | F02D 41/0065 |
| | | | | 701/108 |
| 2013/0081392 | A1* | 4/2013 | Klingbeil | F02D 23/00 |
| | | | | 60/605.2 |
| 2014/0014076 | A1* | 1/2014 | Jayakar | F01P 7/16 |
| | | | | 123/568.12 |

FOREIGN PATENT DOCUMENTS

| | | | |
|---|---|---|---|
| DE | 102004015108 A1 * | 10/2005 | ............ F02B 37/007 |
| JP | H06173800 A | 6/1994 | |
| JP | H11247665 A | 9/1999 | |
| JP | 2008128029 A | 6/2008 | |
| JP | 2009150288 A | 7/2009 | |
| JP | 2013096314 A | 5/2013 | |
| JP | 2013537955 A | 10/2013 | |

OTHER PUBLICATIONS

First Office Action and Search issued in connection with corresponding CN Application No. 201510076660.2 dated Mar. 26, 2018.

Japan Patent Office, Office Action Issued in Application No. 2015020784, dated Dec. 4, 2018, 8 pages. (Submitted with Machine Translation).

\* cited by examiner

METHOD AND SYSTEMS FOR EXHAUST GAS RECIRCULATION

FIELD

Embodiments of the subject matter disclosed herein relate to exhaust gas recirculation in an internal combustion engine.

BACKGROUND

Engines may utilize recirculation of exhaust gas from an engine exhaust system to an engine intake system, a process referred to as exhaust gas recirculation (EGR), to reduce regulated NOx emissions. The particulate matter generated in a cylinder with EGR is highly dependent on the amount of EGR and increases exponentially if the EGR is not controlled. To adhere to increasingly stringent regulations, while optimizing fuel consumption, component reliability and control strategy complexity, it is desirable to minimize the cylinder-to-cylinder emissions variation in a multi-cylinder engine. This can be achieved by delivering a uniform and controlled amount of EGR to all the cylinders.

In some engine systems, a group of one or more cylinders may have an exhaust manifold that is exclusively coupled to an intake passage of the engine such that the group of cylinders is dedicated, at least under some conditions, to generating exhaust gas for EGR. Such cylinders may be referred to as "donor cylinders." Other cylinders may have an exhaust manifold that is exclusively coupled to an exhaust passage of the engine, referred to as "non-donor cylinders." Typically, an equal number of donor and non-donor cylinders may be present in the engine; for example, in a V-12 engine, one cylinder bank (six cylinders) may be comprised of donor cylinders while the other cylinder bank (also six cylinders) may be comprised of non-donor cylinders. This type of arrangement may lead to variation in the cylinder-to-cylinder amount of delivered external EGR as well as cylinder-to-cylinder variation in the amount of trapped in-cylinder EGR.

BRIEF DESCRIPTION

In one embodiment, a system includes a first cylinder group of an engine having a first number of cylinders, a second cylinder group of the engine having a second number of cylinders that is not an integer multiple of the first number of cylinders, and an exhaust system coupled to the first cylinder group and the second cylinder group. In at least one mode of operation, the exhaust system has exhaust ports of the first cylinder group fluidly coupled to an intake of the engine and exhaust ports of the second cylinder group fluidly decoupled from the intake.

In this way, the number of cylinders in the second cylinder group (e.g., non-donor cylinders that are not coupled to the engine intake) is not evenly divided by the number of cylinders in the first cylinder group (e.g., donor cylinders that are coupled to the engine intake). For example, the first number of cylinders may include three cylinders while the second number of cylinders may include five cylinders. In doing so, cylinder-to-cylinder exhaust gas recirculation (EGR) amounts may vary by a relatively low level, such as 1% or less, thus maintaining desired vehicle emissions.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIGS. 6-8B are diagrams illustrating further examples of cylinder parameters for an engine having a donor cylinder configuration according to embodiments of the invention.

DETAILED DESCRIPTION

The following description relates to various embodiments of delivering exhaust gas recirculation (EGR) to an engine, wherein the engine has an uneven number of donor and non-donor cylinders. By providing an uneven number of donor and non-donor cylinders, variation in peak exhaust manifold pressure and pressure amplitude in the exhaust manifold may be reduced, leading to lower variation in the cylinder-to-cylinder amounts of exhaust residuals present during combustion (e.g., external EGR and internal EGR). In one example, in an inline eight cylinder engine, cylinders 1-5 may be non-donor cylinders, while cylinders 6-8 may be donor cylinders. This configuration minimizes exhaust piping complexities while delivering external EGR to each cylinder in amounts that vary by 1% or less. Further, by using a particular cam profile, internal EGR may also be present in each cylinder in amounts that vary by 1% or less. Additionally, in some embodiments, a damping volume may be used to reduce the pressure fluctuations in the charge air (which includes EGR) delivered to the cylinders. As such, particulate matter and/or NOx emissions may be reduced.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and rail vehicles. For clarity of illustration, a marine vessel is provided as an example mobile platform supporting a system incorporating an embodiment of the invention.

Figure 1:
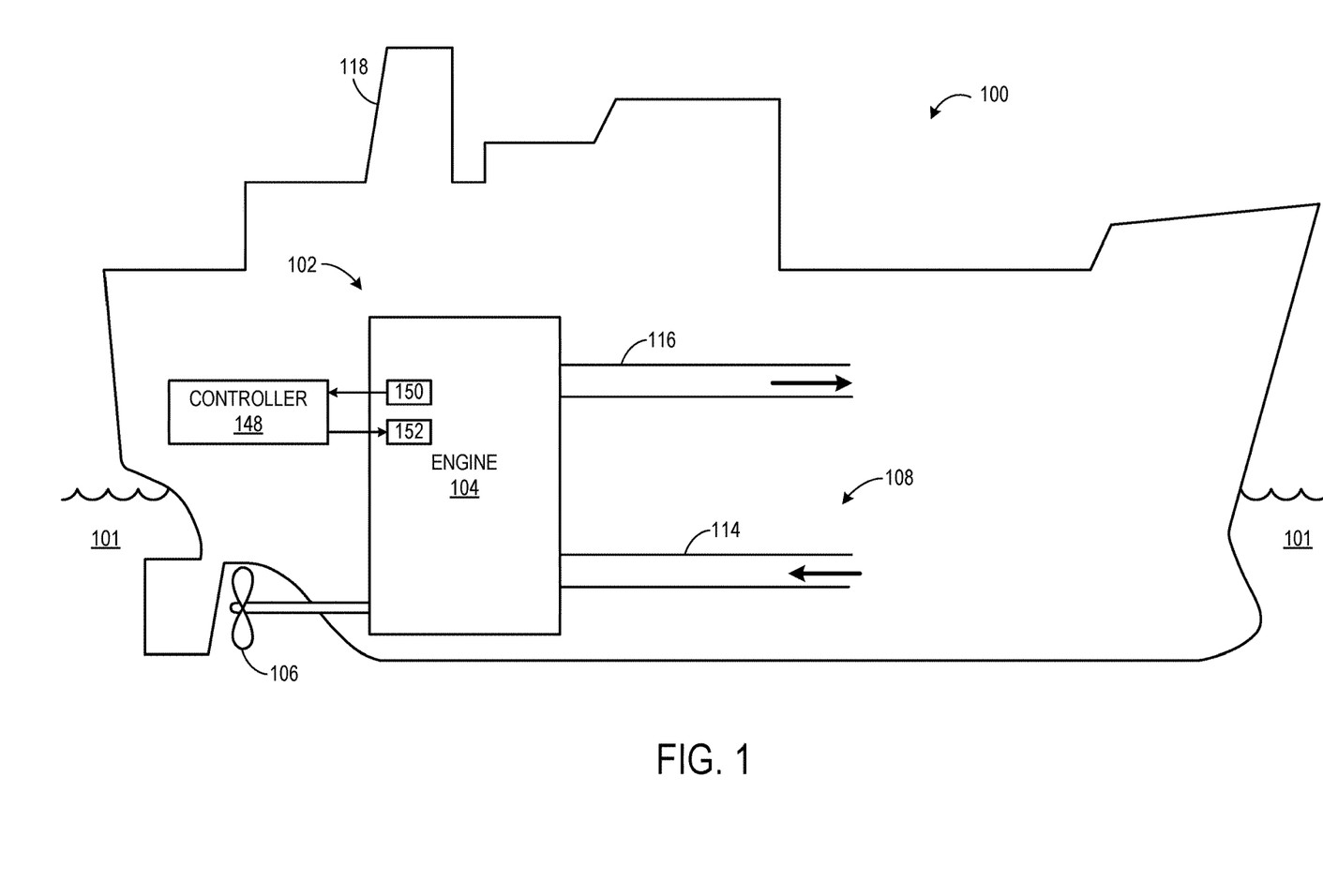
FIG. 1 shows a schematic diagram of an embodiment of a marine vessel with an engine system.

Before further discussion of the donor cylinder configuration, an example of a platform is disclosed in which the EGR system may be configured for an engine in a vessel, such as a marine vessel. For example, FIG. 1 is a block diagram of an embodiment of a system, herein depicted as a marine vessel 100, such as a ship, configured to operate in a body of water 101. The marine vessel 100 includes a propulsion system 102 with an engine 104. However, in other examples, engine 104 may be a stationary engine, such as in a power-plant application, or an engine in a rail vehicle propulsion system. In the embodiment of FIG. 1, a propeller 106 is mechanically coupled to the engine 104 such that it is turned by the engine 104. In other examples, the propulsion system 102 may include a generator that is driven by the engine, which in turn drives a motor that turns the propeller, for example.

The engine 104 receives intake air for combustion through an air induction system 108 which includes an intake conduit 114. The intake conduit 114 receives ambient air from outside of the marine vessel 100. Exhaust gas resulting from combustion in the engine 104 is supplied to an exhaust passage 116. Exhaust gas flows through the exhaust passage 116, and out of an exhaust stack 118 of the marine vessel 100. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition).

The marine vessel 100 further includes a controller 148 to control various components related to the propulsion system 102. In one example, the controller 148 includes a computer control system. The controller 148 further includes computer readable storage media (not shown) including code for enabling on-board monitoring and control of marine vessel operation. The controller 148, while overseeing control and management of the propulsion system 102, may be configured to receive signals from a variety of engine sensors 150, as further elaborated herein, in order to determine operating parameters and operating conditions, and correspondingly adjust various engine actuators 152 to control operation of the marine vessel 100. For example, the controller 148 may receive signals from various engine sensors 150 including, but not limited to, engine speed, engine load, boost pressure, exhaust pressure, ambient pressure, ambient temperature, etc. Correspondingly, the controller 148 may control the propulsion system 102 by sending commands to various components such as cylinder valves, throttle, etc.

Figure 2:
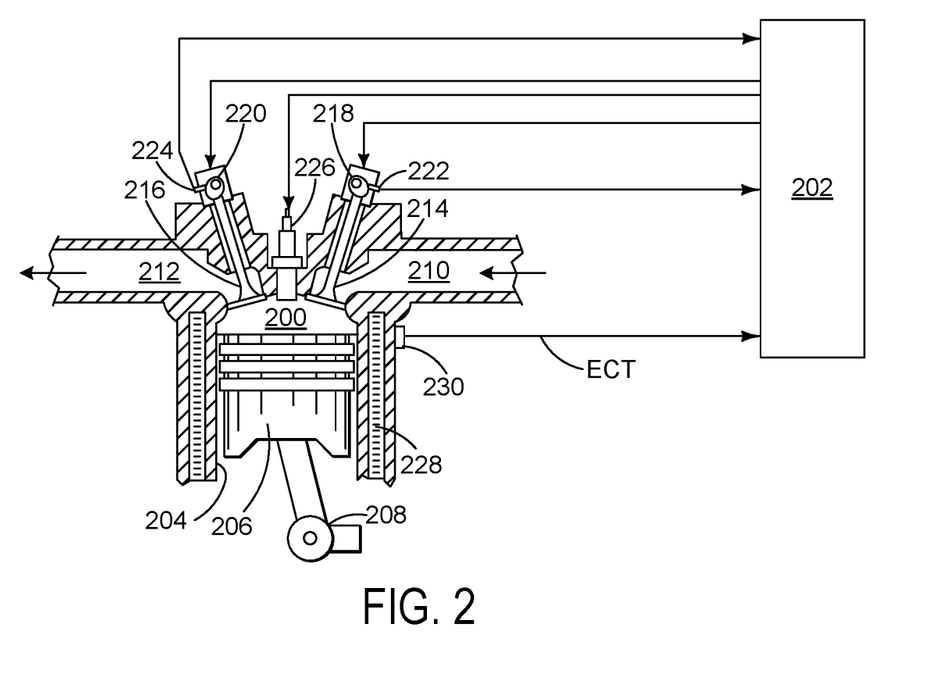
FIG. 2 shows a schematic diagram of one cylinder of an engine according to an embodiment of the invention.

FIG. 2 depicts an embodiment of a combustion chamber, or cylinder 200, of a multi-cylinder internal combustion engine, such as the engine 104 described above with reference to FIG. 1. The engine may be controlled at least partially by a control system including controller 202 which may be in further communication with a vehicle system, such as the vehicle system 100 described above with reference to FIG. 1. In one example, the controller 202 includes a computer control system. The controller 202 may further include computer readable storage media (not shown) including code for enabling on-board monitoring and control of vehicle operation. The controller 202, while overseeing control and management of the vehicle system, may be configured to receive signals from a variety of engine sensors in order to determine operating parameters and operating conditions, and correspondingly adjust various engine actuators to control operation of the vehicle. The controller 202 may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller 202 may control the vehicle system by sending commands to various components such as alternator, cylinder valves, throttle, fuel injectors, etc. In one example, controller 202 may be the same controller as controller 148 of FIG. 1.

The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake passage 210. The intake passage 210 receives ambient air from an air filter (not shown) that filters air from outside of a vehicle in which the engine is positioned. The intake passage 210 may communicate with other cylinders of the engine in addition to the cylinder 200, for example.

Exhaust gas resulting from combustion in the engine is supplied to an exhaust including an exhaust passage 212. Exhaust gas flows through the exhaust passage 212, to a turbocharger in some embodiments (not shown in FIG. 2) and to atmosphere. The exhaust passage 212 may further receive exhaust gases from other cylinders of the engine in addition to the cylinder 200, for example.

In some embodiments, as will be described in greater detail below with reference to FIGS. 3A and 3B, the vehicle system may include more than one exhaust passage. For example, a donor group of cylinders may be coupled to a first exhaust manifold and a non-donor group of cylinders may be coupled to a second exhaust manifold. In this way, one of the groups of cylinders may be comprised exclusively of donor cylinders which recirculate exhaust gas to the intake passage 210 under selected operating conditions.

Continuing with FIG. 2, each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 202 via an actuator 218. Similarly, the exhaust valve 216 may be controlled by the controller 202 via an actuator 220. During some conditions, the controller 202 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank, fuel pumps, and a fuel rail (not shown). In one example, the fuel is diesel fuel that is combusted in the engine through compression ignition. In other non-limiting embodiments, the second fuel may be gasoline, kerosene, biodiesel, or other petroleum distillates of similar density through compression ignition (and/or spark ignition).

Figure 3A:
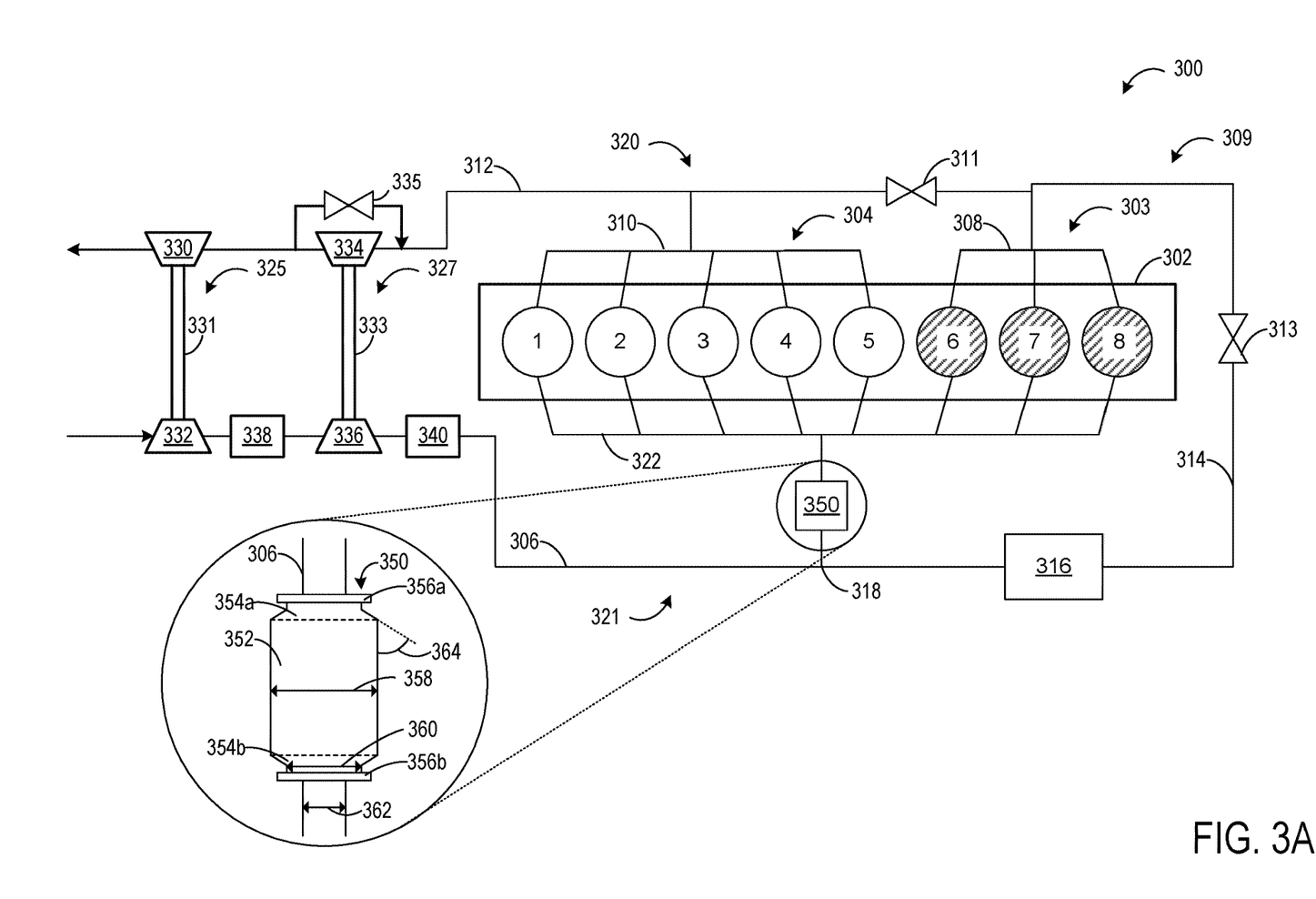
FIGS. 3A and 3B show schematic diagrams of an engine with a plurality of donor cylinders and a plurality of non-donor cylinders according to an embodiment of the invention.
Figure 3B:
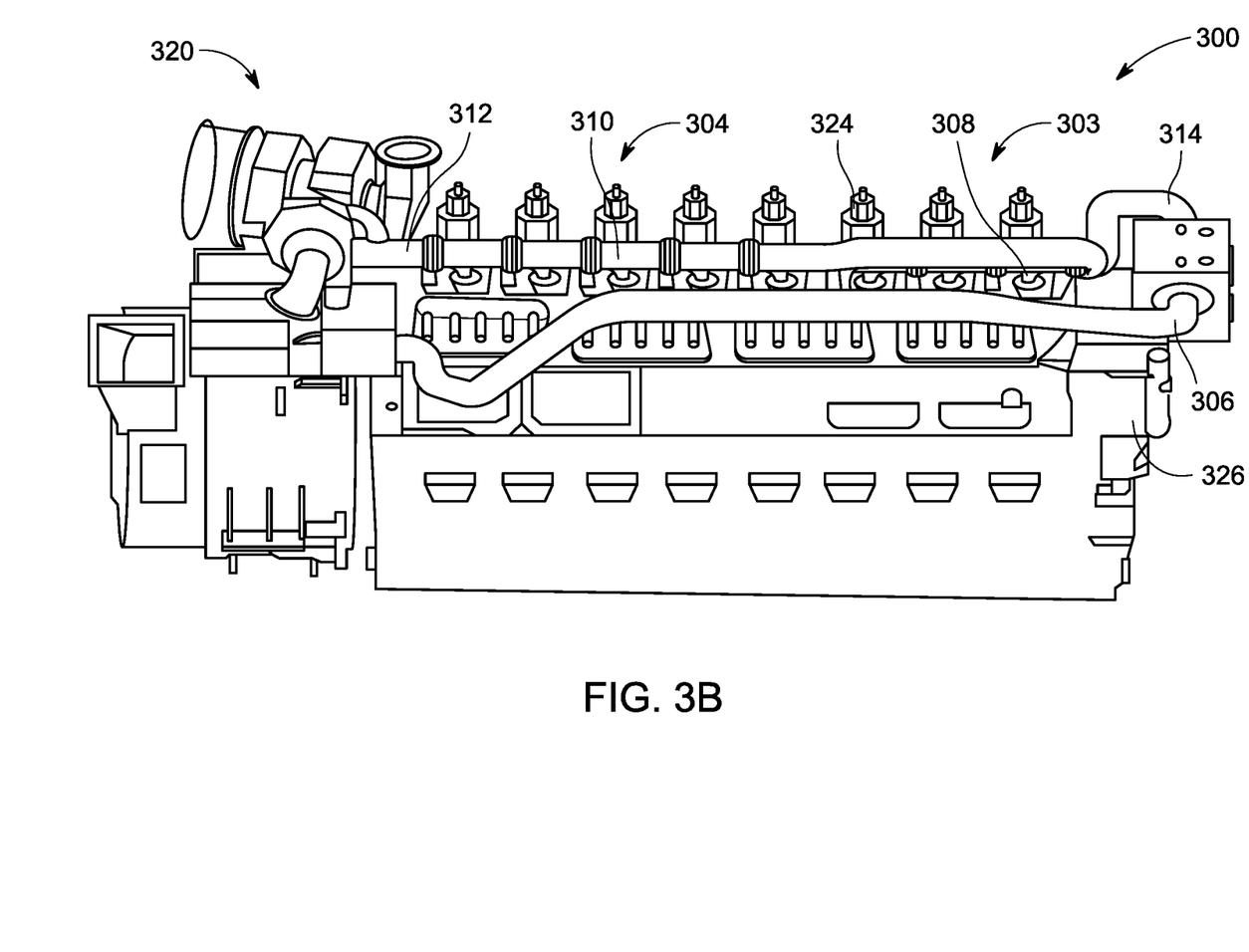

FIGS. 3A and 3B show an embodiment of a system 300 with an engine 302, such as engine 104 described above with reference to FIG. 1, having a plurality of donor cylinders 303 and a plurality of non-donor cylinders 304. In the embodiment of FIGS. 3A and 3B, the engine 302 is an I-8 engine having eight cylinders. In other examples, the engine may be a V-6, V-8, V-10, V-12, V-16, I-4, I-6, opposed 4, or another engine type. The engine 302 is coupled to an exhaust 320 and an intake 321, described in more detail below.

In the embodiment of FIGS. 3A and 3B, the donor cylinders 303 are depicted as a first group of cylinders comprising three cylinders (e.g., cylinders labeled 6, 7, and 8 in FIG. 3A). The non-donor cylinders 304 are depicted as a non-donor group of cylinders comprising five cylinders (e.g., cylinders labeled 1, 2, 3, 4, and 5 in FIG. 3A). In other embodiments, the engine may include at least one donor cylinder and at least one non-donor cylinder. For example, the engine may have five donor cylinders and seven non-donor cylinders, or other donor and non-donor configurations. In some examples, the engine may have an equal number of donor and non-donor cylinders, while in other examples the engine may have an unequal number of donor vs. non-donor cylinders. Further, in some examples where the engine includes an unequal number of donor and non-donor cylinders, the number of non-donor cylinders may not be an integer multiple of the number of donor cylinders (for example, three donor cylinders and five non-donor cylinders). It should be understood, the engine may have any desired number of donor cylinders and non-donor cylinders, with the number of donor cylinders typically lower than or equal to the number of non-donor cylinders.

As depicted in FIGS. 3A and 3B, the donor cylinders 303 are coupled to a first exhaust manifold 308 which is part of an exhaust gas recirculation (EGR) system 309. The first exhaust manifold 308 is coupled to the exhaust ports of the donor cylinders. As such, in the present example, the donor cylinders 303 are coupled exclusively to the first exhaust manifold 308. Exhaust gas from each of the donor cylinders 303 is routed through an EGR passage 314 of the EGR system 309 to an exhaust gas inlet 318 in the intake passage 306, and not to atmosphere. Exhaust gas flowing from the donor cylinders through the EGR passage 314 to the intake passage 306 passes through an EGR cooler 316 to cool the exhaust gas before the exhaust gas returns to the intake passage. The EGR cooler 316 is in fluid communication with a liquid coolant or other coolant to cool the exhaust gases from the donor cylinders 303. In some embodiments, the liquid coolant may be the same coolant that flows through the cooling sleeve surrounding each cylinder, such as cooling sleeve 228 depicted in FIG. 2, for example. One or more charge air coolers 338 and 340 disposed in the intake passage 306 (e.g., upstream of where the recirculated exhaust gas enters) may be adjusted to further increase cooling of the charge air such that a mixture temperature of charge air and exhaust gas is maintained at a desired temperature.

In the embodiment illustrated in FIGS. 3A and 3B, the non-donor cylinders 304 are coupled to a second exhaust manifold 310. The second exhaust manifold 310 is coupled to the exhaust ports of at least the non-donor-cylinders, but, in some examples, may be coupled to exhaust ports of the donor cylinders. For example, exhaust gas from one or more of the donor cylinders may be directed to the second exhaust manifold 310 via a control element, such as an EGR flow valve 311, such that an amount of EGR may be reduced as desired, for example. Thus, in some examples, the non-donor cylinders 304 are coupled exclusively to the second exhaust manifold 310. Exhaust gas from the non-donor cylinders 304 flows to the exhaust 320, and then to atmosphere (after it passes through an exhaust gas treatment system 130 and first and second turbochargers 325 and 327). The exhaust system includes an exhaust passage 312 coupled to the second exhaust manifold 310 and may include exhaust gas treatment devices, elements, and components, for example, a diesel oxidation catalyst, a particulate matter trap, hydrocarbon trap, an SCR catalyst, etc., as described above. Further, in some examples, exhaust gas from the non-donor cylinders 304 may drive the turbine of a turbocharger (such as first and second turbochargers 325 and 327).

Some embodiments may include a communication passage between the first exhaust manifold 308 and the second exhaust manifold 310 (or between the EGR passage 314 and the exhaust passage 312). In some examples, the communication may include a valve (e.g., EGR flow valve 311), and the controller may operate the valve to control communication between the donor cylinders and the non-donor cylinders. In such an example, exhaust gas flow from the donor cylinders may be routed to atmosphere instead of to the intake passage or exhaust gas flow from the non-donor cylinders may be routed to the intake passage.

In embodiments in which the engine is a V-engine, the exhaust manifolds 308 and 310 may be inboard exhaust manifolds. For example, the exhaust ports of each of the cylinders are lined up on the inside of the V-shape. In other embodiments, the exhaust manifolds 308 and 310 may be outboard exhaust manifolds. For example, the exhaust ports of each of the cylinders are lined up on the outside of the V-shape.

The donor cylinders 303 and non-donor cylinders 304 are each coupled to an intake 321 including a single intake manifold 322. Intake manifold 322 may be coupled to the intake ports of each cylinder of engine 302. Intake manifold 322 may receive fresh air from intake passage 306 and/or exhaust gas routed to intake passage 306 via the donor cylinders 303.

The amount of EGR may be controlled by EGR flow valve 311 and an EGR backpressure valve 313. As explained previously, the EGR flow valve 311 may regulate the amount of exhaust from the donor cylinders that is routed to atmosphere. The EGR backpressure valve may regulate the pressure of the exhaust flowing in EGR passage 314 and/or prevent back flow of intake air and exhaust through EGR passage 314 to the donor cylinders 303. EGR flow valve 311 and EGR backpressure valve 313 may be regulated based on a signal sent from a controller, such as controller 202 of FIG. 2 or controller 148 of FIG. 1.

As depicted in FIG. 3A, the system 300 further includes a two-stage turbocharger with the first turbocharger 325 and the second turbocharger 327 arranged in series, each of the turbochargers 325 and 327 arranged between the intake passage 306 and the exhaust passage 312. The two-stage turbocharger increases air charge of ambient air drawn into the intake passage 306 in order to provide greater charge density during combustion to increase power output and/or engine-operating efficiency. The first turbocharger 325 operates at a relatively lower pressure, and includes a first turbine 330 which drives a first compressor 332. The first turbine 330 and the first compressor 332 are mechanically coupled via a first shaft 331. The first turbocharger may be referred to the "low-pressure stage" of the turbocharger. The second turbocharger 327 operates at a relatively higher pressure, and includes a second turbine 334 which drives a second compressor 336. The second turbocharger may be referred to the "high-pressure stage" of the turbocharger. The second turbine and the second compressor are mechanically coupled via a second shaft 333.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In the embodiment shown in FIG. 3A, the second turbocharger 327 is provided with a turbine bypass valve 335 which allows exhaust gas to bypass the second turbocharger 327. The turbine bypass valve 335 may be opened, for example, to divert the exhaust gas flow away from the second turbine 334. In this manner, the rotating speed of the compressor 336, and thus the boost provided by the turbochargers 325, 327 to the engine 302 may be regulated during steady state conditions. Additionally, the first turbocharger 325 may also be provided with a turbine bypass valve. In other embodiments, only the first turbocharger 325 may be provided with a turbine bypass valve, or only the second turbocharger 327 may be provided with a turbine bypass valve. Additionally, the second turbocharger may be provided with a compressor bypass valve, which allows gas to bypass the second compressor 336 to avoid compressor surge, for example. In some embodiments, first turbocharger 325 may also be provided with a compressor bypass valve, while in other embodiments, only first turbocharger 325 may be provided with a compressor bypass valve.

Thus, intake air entering system 300 may travel through intake passage 306, where it may be compressed by first compressor 332 and second compressor 336. The intake air may be cooled by charge air cooler 338, disposed between first and second compressors 332, 326, and by charge air cooler 340, disposed downstream of second compressor 336. EGR from the donor cylinder 303 may enter intake passage 306 at EGR inlet 318. The EGR and fresh intake air may be mixed by a mixer in some examples.

In the example illustrated in FIG. 3A, a damping volume 350 is positioned downstream of EGR inlet 318 such that the mixture of fresh air and EGR is passed through damping volume 350 prior to reaching the intake manifold 322. However, in some embodiments, damping volume 350 may be positioned in EGR passage 314 upstream of EGR inlet 318 such that only EGR is passed through damping volume 350.

Damping volume 350 comprises a duct member/structure that defines a large volume (relative to a per-unit length volume of the intake passage upstream and/or downstream of the damping volume) which alters the wave dynamics of incoming gases. The large volume dampens the variations in the incoming flow and thus reduces the variations in outgoing flow. The benefits of the damping volume may depend on the shape of the damping volume.

In one example, damping volume 350 may be shaped as a straight pipe (e.g., a straight cylinder). In another example, damping volume 350 may be shaped as a cylinder that includes two taper regions coupling a central cylinder region to the intake passage. As shown in FIG. 3A, damping volume 350 includes a collection region 352 (bounded by the dashed lines in the enlarged image of damping volume 350). Collection region 352 may taper towards the intake passage 306 in each direction, and thus includes a first taper region 354a and a second taper region 354b. Each taper region may be coupled to intake passage 306 via a flange. As such, first flange 356a couples first taper region 354a to intake passage 306, and second flange 356b couples second taper region 354b to intake passage 306.

Gas flow (e.g., intake air and/or EGR) may enter damping volume 350 through second taper region 354b. Due to the tapering towards collection region 352, the gas flow may expand. As such, second taper region 354b may be referred to as an expansion region. The gas flow then exits damping volume 350 through first taper region 354a. Due to the tapering towards intake passage 306, first taper region 354a may be referred to as a contraction region.

Collection region 352 may have a first diameter 358. First diameter 358 may be the largest diameter or width of damping volume 350. Both first taper region 354a and second taper region 354b may have tapered side walls that taper at an angle 364 with respect to the side wall of the collection region 352 towards the intake passage 306. However, the side walls may only taper for a portion of the respective taper region, at which point the side walls may run parallel with the intake passage 306/direction of gas flow. This portion of the taper region may have a second diameter 360 that is smaller than the first diameter 358. Further, intake passage 306 may have a third diameter 362 that is smaller than both the first diameter 358 and the second diameter 360.

Thus, in one example, damping volume 350 may be shaped as a cylinder having an expansion region where intake air and/or EGR enters the damping volume and expands toward a central collection region. As the gas flows through the collection region, it enters a contraction region where the gas flow volume is contracted before flowing out of the damping volume. The expansion region and contraction region may each have a diameter that is smaller than the diameter of the collection region. A diameter of the intake passage may be smaller than the diameters of the expansion, collection, and contraction regions of the damping volume.

As shown, the side walls of the damping volume may taper between the collection region and each end of the damping volume (e.g., where each flange couples damping volume to the intake passage). The side walls may taper for a portion of the expansion and contraction regions (e.g., they may taper for half the length of the expansion and contraction regions). However, in other embodiments, the side walls may taper continuously the entire length of the expansion and contraction regions. Further, the damping volume 350 as illustrated in FIG. 3A is a separate component coupled to the intake passage via flanges. In some embodiments, rather than being a separate component from the intake passage, the damping volume may simply be an enlarged portion of the intake passage. Further still, while the damping volume 350 of FIG. 3A is shaped as a cylinder, it is to be understood that the damping volume may have other suitable shapes, such as rectangular, circular, etc. The damping volume may have a suitable size, such as 63 liters. In another example, the damping volume may have another volume, such as 50 liters or 60 liters. The damping volume may be sized to hold a volume of charge air (e.g., fresh intake air and/or EGR) that is equal to or greater than a total volume of the cylinders of the engine in one example.

Figure 6:
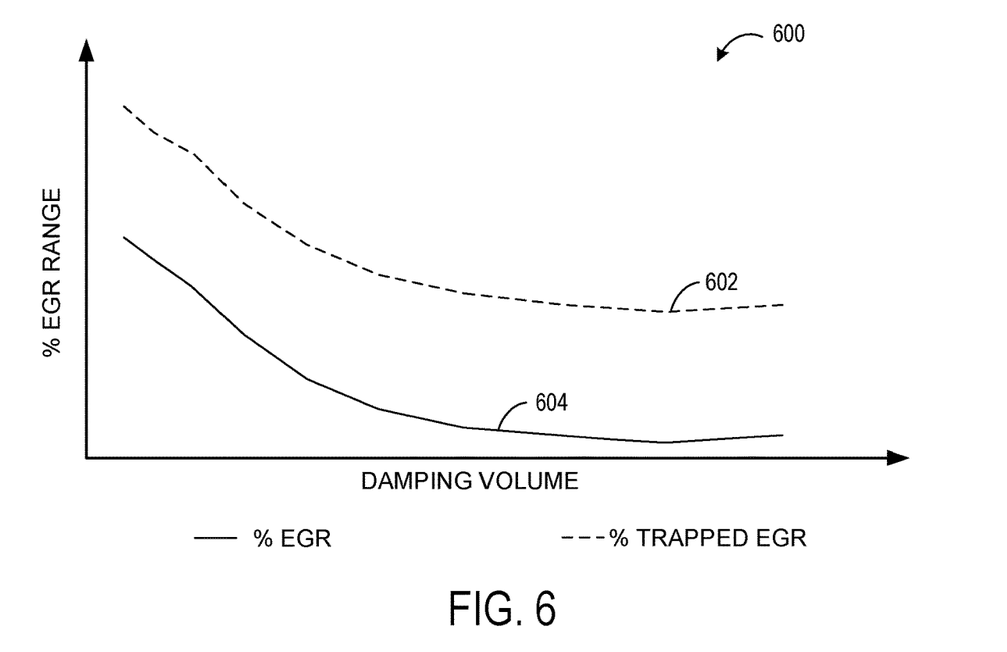
Figure 7:
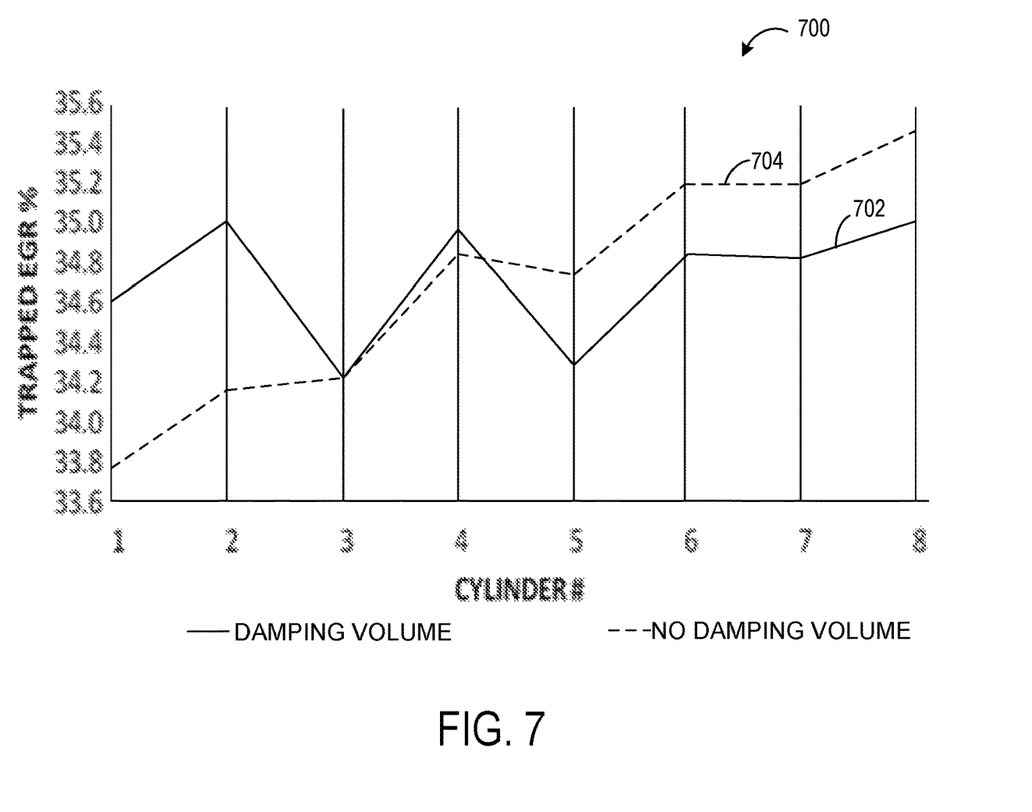

The damping volume may act to absorb pressure fluctuations in the charge air (e.g., fresh intake air and/or EGR) distributed to the cylinders. In doing so, EGR flow and cylinder pressure may be equalized among all the cylinders, reducing the variation in EGR among the cylinders. FIGS. 6 and 7 illustrate example effects of including a damping volume in an engine having three donor cylinders, as described above.

FIG. 6 is a diagram 600 illustrating how the size (e.g., volume) of the damping volume impacts the variation in the percentage of external and internal EGR among the cylinders. The volume of the damping volume is illustrated along the horizontal axis and the EGR variation among the cylinders (% EGR range) is illustrated along the vertical axis. For both internal EGR (% trapped EGR), shown by dotted curve 602, and external EGR (% EGR), shown by solid curve 604, as the volume of the damping volume increases, the variation in the cylinder-to-cylinder EGR % decreases.

FIG. 7 is a diagram 700 illustrating the impact of a damping volume on the cylinder-to-cylinder variation of trapped EGR. Trapped EGR % is plotted on the vertical axis, and each respective cylinder of an eight-cylinder inline engine having three donor and five non-donor cylinders is plotted on the horizontal axis. As shown by solid curve 702, the inclusion of a damping volume in the engine system reduces the cylinder-to-cylinder variation in trapped EGR % compared to an engine system that does not include a damping volume (shown by dotted curve 704). For example, with a damping volume, the trapped EGR % ranges from a high of approximately 35% (cylinder 2) to a low of 34.2% (cylinder 3). In contrast, without a damping volume, the trapped EGR % ranges from a high of 35.3% (cylinder 8) to a low of 33.8% (cylinder 1). Thus, the inclusion of the damping volume decreases the variation in trapped EGR % among the cylinders.

Returning to FIG. 3B, each cylinder of the donor cylinder group 303 and each cylinder of the non-donor cylinder group 304 is comprised of a cylinder head 324 coupled to a cylinder block 326. Cylinder head 324 is one of a plurality of cylinder heads that are included as part of engine 302. Thus, engine 302 includes a plurality of cylinder heads, one for each cylinder of the engine, coupled to an engine block. Each cylinder head includes at least one intake port and at least one exhaust port. Each intake port is coupled to the intake manifold intake manifold 322. Further, each exhaust port of the donor cylinder group 303 is coupled to the first exhaust manifold 308 and each exhaust port of the non-donor cylinder group 304 is coupled to the second exhaust manifold 310.

Thus, system 300 includes an engine 302 having first cylinder group 303 comprising a plurality of donor cylinders coupled to a first exhaust manifold. The first exhaust manifold is fluidically coupled to an EGR passage that is fluidically coupled to an intake passage of the engine intake system. Therefore, exhaust gas produced from the donor cylinders is routed back to the intake to be used as part of the charge air for combustion. Engine 302 has a second cylinder group 304 comprising a plurality of non-donor cylinders fluidically coupled to a second exhaust manifold. The second exhaust manifold is fluidically coupled to an exhaust passage that leads to the turbochargers. Exhaust first flows through the high pressure turbine. Some exhaust flow can bypass the high pressure turbine through turbine bypass valve 335. The exhaust flow out of the high pressure turbine combines with any flow passing through turbine bypass valve 335 and enters the low pressure turbine. The exhaust flow out of the low pressure turbine leads to atmosphere. Therefore, exhaust gas produced from the non-donor cylinders is routed to atmosphere.

In the illustrated example, the first, donor cylinder group includes three cylinders and the second, non-donor cylinder group includes five cylinders. Thus, the number of cylinders in the second cylinder group 304 (e.g., five cylinders) is not an integer multiple of the number of cylinders of the first cylinder group 303 (e.g., three cylinders). In an example, the engine 302 of system 300 only has three donor cylinders and five non-donor cylinders. The donor cylinders are arranged on a first end of the engine 302 while the non-donor cylinders are arranged on a second, opposite end of the engine from the donor cylinders. As such, the first, donor cylinder group is continuous and the second, non-donor cylinder group is continuous. Said another way, the donor cylinder group does not include any intervening non-donor cylinders, and the non-donor cylinder group does not include any intervening donor cylinders. By providing the donor cylinders in one grouping at one end of the engine and the non-donor cylinders in another grouping at the other end of the engine, packing and routing complexities of the exhaust manifolds and passageways and EGR system may be reduced. However, in other examples, the donor and non-donor cylinders may be arranged in other configurations, such as the donor cylinders comprising cylinder numbers 3-5 and the non-donor cylinders comprising cylinder numbers 1, 2, and 6-8.

As shown in FIGS. 3A and 3B, the donor cylinders and non-donor cylinders are each coupled to a single intake manifold. The fresh air first passes through an air filter (not shown) mounted to the low pressure compressor. The fresh air flows through the low pressure compressor and is cooled across the first stage cooler (charge air cooler 338). In this embodiment the first stage cooler is a liquid-to-air cooler that utilizes water as coolant from a coolant vessel, for example. Next, the fresh air flows through the high pressure compressor and is cooled across the second stage cooler (second charge air cooler 340). In this embodiment the second stage cooler also utilizes water coolant. After the second stage cooler, the fresh air flows into the damping volume where it mixes with the EGR exhaust and enters the intake manifold.

By including three donor cylinder and five non-donor cylinders, peak cylinder pressure and the amplitude of pressure waves in both the donor and non-donor cylinders may be reduced compared to a similar engine having four donor cylinders and four non-donor cylinders (see Table 1), leading to a more even distribution of EGR among the cylinders.

TABLE 1

Cylinder pressure profile of four donor and three donor cylinder engine configurations.

| Donor configuration | Donor peak cylinder pressure (kPa) | Non-donor peak cylinder pressure (kPa) | Donor pressure amplitude (kPa) | Non-donor pressure amplitude (kPa) |
|---|---|---|---|---|
| 4 Donor (5678) | 653 | 529 | 215 | 296 |
| 3 Donor (678) | 622 | 489 | 189 | 210 |

As such, the cylinder-to-cylinder variation in the amount of delivered, external EGR may be reduced, to 1% or less in one example. Further, by setting the timing of the intake and/or exhaust valve opening and closing for each cylinder to an optimized profile, internal EGR (e.g., in-cylinder trapped exhaust gases) variation may also be reduced. In one example, all the donor cylinders and the non-donor cylinders may have the same cam profile, that is, each cylinder may open and close its respective intake and exhaust valves at the same time. In an example, the donor and the non-donor cylinders may have a cam profile that includes a valve overlap period of 42°. In another example, the donor and non-donor cylinders may have different exhaust valve closing timings. For example, exhaust valves of the non-donor cylinders may close earlier than the exhaust valves of the donor cylinders, such as with a valve overlap period of 32°.

Exhaust valve closing timing can be modified to minimize the variation of trapped exhaust used for combustion between cylinders. The overall trapped exhaust in the cylinder is a combination of the external EGR from the donor cylinder exhaust and internal EGR due to incomplete emptying of the combustion products from the cylinder. For the same exhaust valve closing timing, as the cylinder exhaust back pressure increases, less exhaust will exit the cylinder during the exhaust stroke, resulting in more internal EGR. By delaying the exhaust valve closing time, more exhaust will exit the cylinder during the exhaust stroke, resulting in less internal EGR. Since the donor cylinders have a higher exhaust back pressure when compared to non-donor cylinders due to the pumping work performed by the donor cylinders, the exhaust valve closing time may need to be adjusted for donor and/or non-donor cylinders to more evenly distribute in-cylinder trapped exhaust between cylinders. In one example, the donor cylinders use one exhaust valve closing time and the non-donor cylinders use a second exhaust valve closing time. It may be desirable to select a different exhaust valve closing time for each cylinder depending on the variation in external EGR and/or the requirement for cylinder-to-cylinder trapped exhaust variation.

Figure 8A:
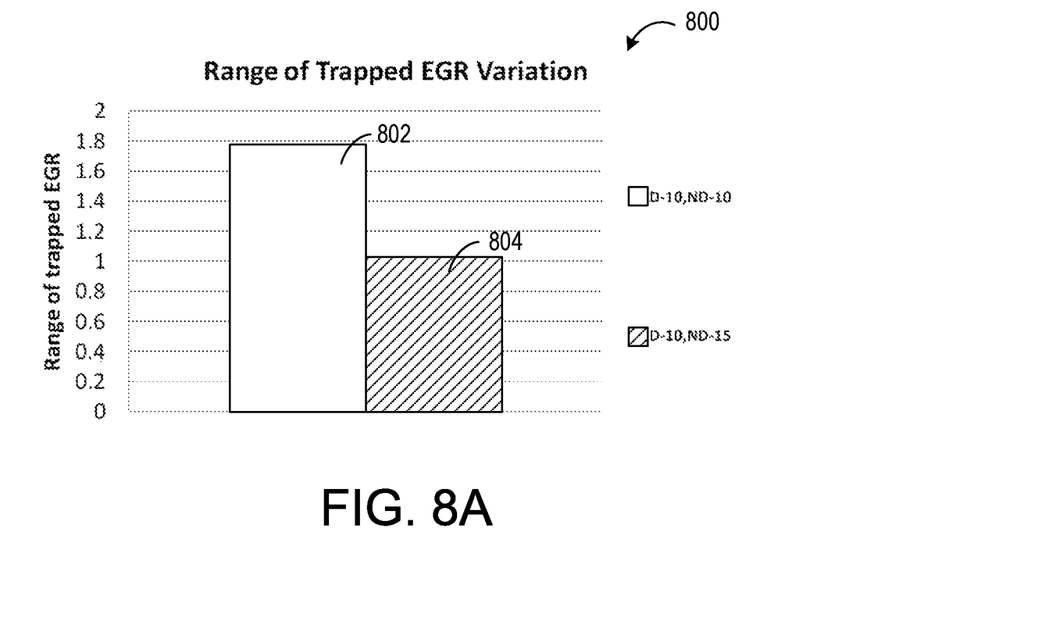
Figure 8B:
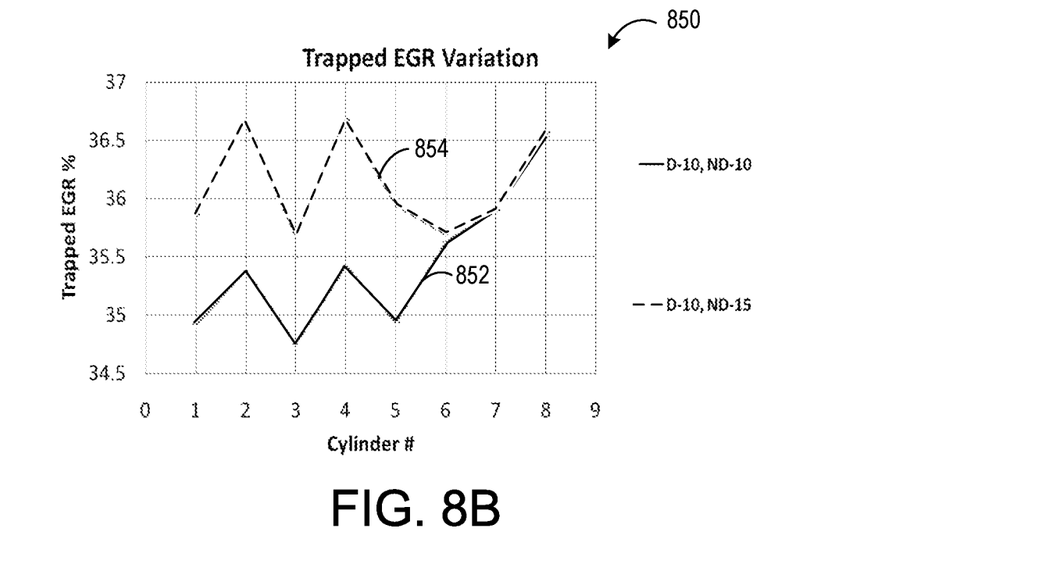

FIGS. 8A and 8B illustrate the effect of exhaust valve closing timing on the variation in trapped (e.g., internal) EGR. FIG. 8A is a diagram 800 illustrating the range of trapped EGR for an engine with a variable camshaft timing system set so that the donor cylinders and non-donor cylinders have a similar cam profile vs. the timing system set so that the donor and non-donor cylinders have different cam profiles. Specifically, the solid bar 802 shows a relatively high trapped EGR % range, approximately 1.8, for an exhaust valve closing timing of −10° TDC for both the donor cylinders and non-donor cylinders. In contrast, as shown by dashed bar 804, by setting the exhaust valve closing timing of the non-donor cylinders to be earlier than the donor cylinders (e.g., valve overlap of 32° for the non-donor cylinders and 42° for the donor cylinders), the variation is reduced to 1 or less. Further, as shown in diagram 850 of FIG. 8B, by closing the exhaust valves of the non-donor cylinders earlier than the exhaust valves of the donor cylinders (as shown by dashed curve 854), the trapped EGR % of the non-donor cylinders (cylinders 1-5) increases as compared to the trapped EGR % of the non-donor cylinders when the non-donor cylinders have the same exhaust valve closing timing as the donor cylinders (as shown by solid line 852).

Thus, by configuring the engine, exhaust, and intake such that an unequal number of donor and non-donor cylinders are present (such as three donor and five non-donor cylinders), as well as including a damping volume and/or closing the exhaust valves of the non-donor cylinders earlier than the exhaust valves of the donor cylinders, both external and internal EGR variation among cylinders may be reduced to below a given threshold, such as 1% or less. Table 2 shows mean external and internal EGR and range for all the cylinders in a three-donor cylinder engine, such as engine 302. As shown, both the internal EGR (e.g., trapped EGR) and external EGR may have a range (e.g., cylinder-to-cylinder variation) of less than 1%.

TABLE 2

EGR in an inline eight cylinder engine with three donor cylinders.

|  | Mean | Range |
|---|---|---|
| External EGR (%) | 33.52 | 0.38 |
| Trapped EGR (%) | 35.18 | 0.84 |
| AFR | 23.96 | 1.31 |

Figure 4:
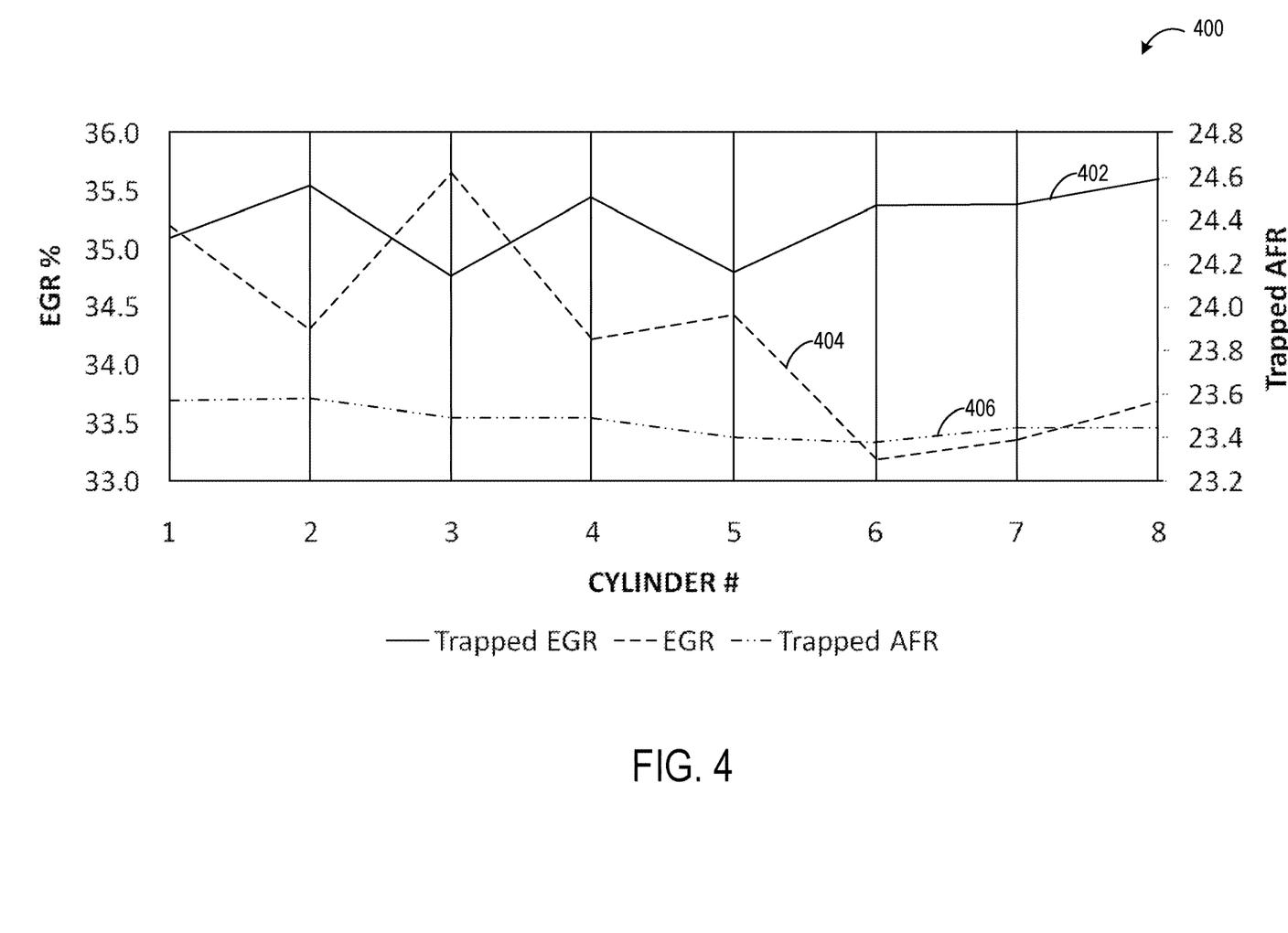
FIG. 4 is a diagram illustrating examples of cylinder parameters for an engine having a donor cylinder configuration according to an embodiment of the invention.

FIG. 4 is a diagram 400 illustrating percentage EGR and air-fuel ratio (AFR) for each cylinder of an inline eight cylinder engine having three donor cylinders (cylinder numbers 6-8) and five non-donor cylinders (cylinder numbers 1-5), such as engine 302 of FIG. 3. As shown by solid line 402, the amount of trapped EGR in each cylinder is in a range of about 34.5% to about 35.5%, while the amount of external EGR (e.g., exhaust gas originating from the donor cylinders) in each cylinder is in a range of about 33% to about 35.5%, as shown by dashed line 404. Further, the trapped AFR in each cylinder, as shown by dashed-dotted line 406, is in a range of about 23.4 to about 23.6.

Thus, in one embodiment, the systems described herein provide for a system, comprising a first cylinder group of an engine having a first number of cylinders, a second cylinder group of the engine that is not an integer multiple of the first number of cylinders, and an exhaust system coupled to the first cylinder group and the second cylinder group. In at least one mode of operation, the exhaust system has exhaust ports of the first cylinder group fluidly coupled to an intake of the engine and exhaust ports of the second cylinder group fluidly decoupled from the intake.

The first number of cylinders and the second number of cylinders, in combination, may comprise all the cylinders of the engine. That is, the engine has no cylinders other than those in the first cylinder group (e.g., donor cylinders) and the second cylinder group (e.g., non-donor cylinders). In one aspect of the invention, the cylinders of the first cylinder group are the only donor cylinders of the engine, and the cylinders of the second cylinder group are the only non-donor cylinders of the engine. In another aspect, the cylinders in the first cylinder group are exclusive of the cylinders in the second group, that is, none of the cylinders of the first group are also cylinders of the second group, and vice versa.

The system may further comprise a damping volume positioned in the intake, the damping volume comprising an expansion region to collect charge air prior to distributing the charge air to the engine, the charge air comprising one or more of intake air and exhaust gas from the first cylinder group.

In an example, the engine is an inline eight-cylinder engine, the first number of cylinders is three cylinders, and the second number of cylinders is five cylinders. A first exhaust manifold may be coupled to the first cylinder group and a second exhaust manifold may be coupled to the second cylinder group, the first exhaust manifold fluidically coupled to the intake and the second exhaust manifold fluidically coupled to the exhaust. An intake manifold may be fluidically coupled to the intake and to the first cylinder group and the second cylinder group.

Each cylinder of the first cylinder group and the second cylinder group may include a respective intake valve and a respective exhaust valve, and the system may further comprise a variable camshaft timing system configured to set an opening timing and a closing timing of each respective intake valve and exhaust valve. In one example, each cylinder of the first cylinder group and each cylinder of the second cylinder group may have the same intake and/or exhaust valve closing timings. In another example, the exhaust valve closing timing of each exhaust valve of the second cylinder group is earlier than the exhaust valve closing timing of each exhaust valve of the first cylinder group.

The system may be included as part of a vehicle, and the vehicle may further comprise a propulsion system for moving the vehicle. The engine may be coupled to the propulsion system for powering the propulsion system.

In an embodiment, a system comprises an inline eight-cylinder engine coupled to an intake and an exhaust. (That is, the engine has eight cylinders and eight cylinders only.) The engine comprises a donor cylinder group having three cylinders configured to route exhaust gas to the intake. The system further comprises a non-donor cylinder group having five cylinders configured to route exhaust gas exclusively to atmosphere. According to an aspect, the donor cylinder group and the non-donor cylinder group are exclusive, that is, none of the cylinders of the donor cylinder group are non-donor cylinders, and vice versa.

In another embodiment, a system comprises an inline eight-cylinder engine coupled to an intake and an exhaust. The engine comprises a donor cylinder group comprising three cylinders configured to route exhaust gas to the intake. Each cylinder of the donor cylinder group may have a respective exhaust valve with a first exhaust valve closing timing. The system further comprises a non-donor cylinder group comprising five cylinders configured to route exhaust gas exclusively to atmosphere. Each cylinder of the non-donor cylinder group may have a respective exhaust valve with a second exhaust valve closing timing earlier than the first exhaust valve closing timing. In some examples, a cylinder-to-cylinder variation of an amount of exhaust residuals within each cylinder of the engine during combustion may be 1% or less. The exhaust residuals may comprise exhaust gas recirculation (EGR) from the donor cylinder group and trapped exhaust gas. In examples, a cylinder-to-cylinder variation of an amount of trapped exhaust within each cylinder of the engine during combustion is 1% or less.

In an example, each cylinder of the donor cylinder group may have a maximum exhaust manifold pressure of 650 kPa or less and an exhaust manifold pressure amplitude of 200 kPa or less. Each cylinder of the non-donor exhaust manifold group may have a maximum exhaust manifold pressure of 500 kPa or less and an exhaust manifold pressure amplitude of 220 kPa or less. The donor cylinder group may be positioned on a first end of the engine and the non-donor cylinder group may be positioned on a second, opposite end of the engine. Said another way, in a direction of the engine extending from a first end of engine to a second end of the engine, the three cylinders of the donor cylinder group are arrayed consecutively starting at the first end in first, second, and third cylinder positions, respectively, and the five cylinders of the non-donor cylinder group are arrayed consecutively starting at a fourth cylinder position next to the third cylinder position and extending to the second end.

The system may further comprise a damping volume positioned in an intake passage of the intake upstream of an intake manifold, the intake manifold fluidically coupled to each cylinder of the donor cylinder group and each cylinder of the non-donor cylinder group. The damping volume may comprise an expansion region, a collection region, and a contraction region, where a first diameter of the collection region is larger than a second diameter of the expansion region, the second diameter of the expansion region larger than a third diameter of the intake passage.

Figure 5:
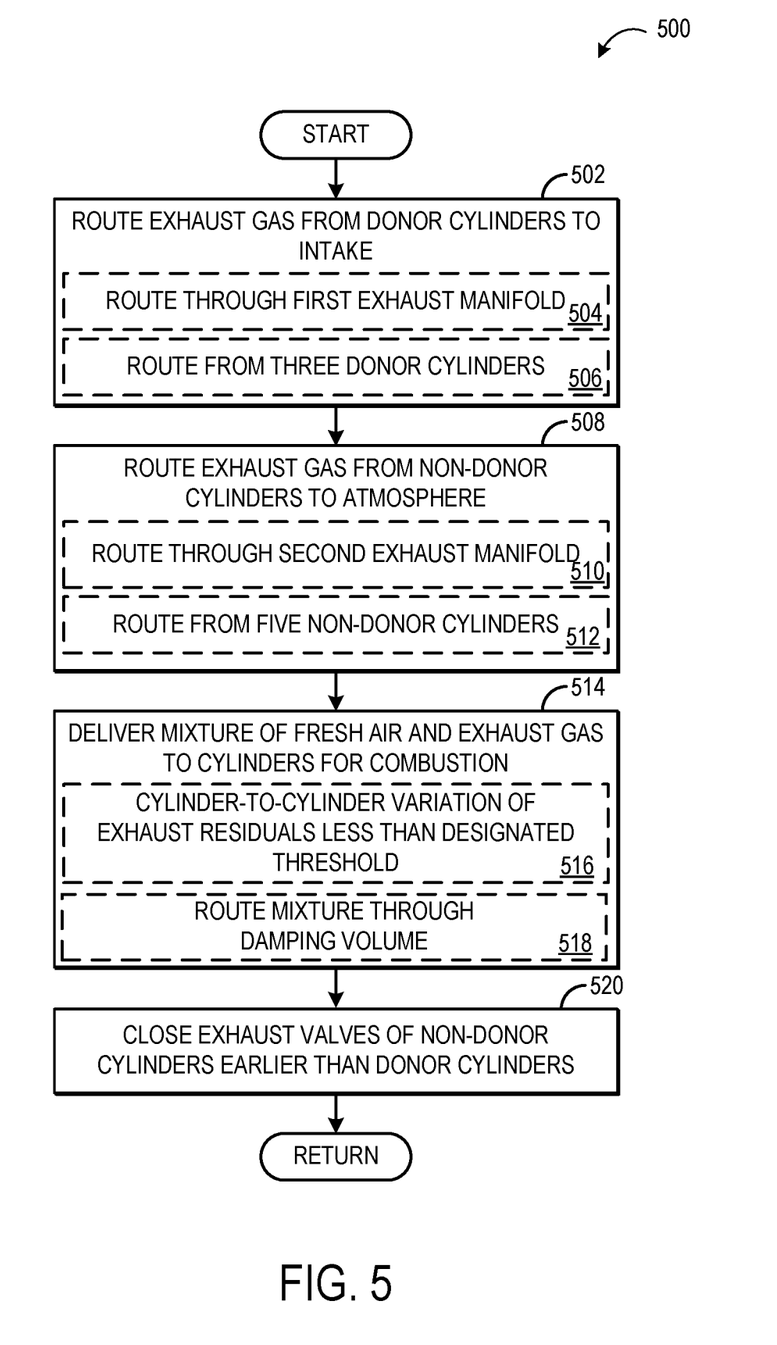
FIG. 5 is a flow chart illustrating a method for routing exhaust gas according to an embodiment of the invention.

FIG. 5 is a flow chart illustrating a method 500 for routing exhaust gas in an engine having an uneven donor/non-donor cylinder configuration, such as in engine 302 of FIG. 3. Method 500 includes, at 502, routing exhaust gas from a donor cylinder group to an intake of the engine. For example, as explained above, the donor cylinder group may be fluidically coupled to the engine intake via a first exhaust manifold. Exhaust gas from the donor cylinder group may be recirculated back to the engine via the intake to be combined with fresh air for a subsequent combustion. As such, as indicated at 504, routing exhaust from the donor cylinders may include routing exhaust through a first exhaust manifold fluidically coupled to the donor cylinders and the intake. In order to maintain cylinder-to-cylinder variation in the amount of exhaust gas delivered to the cylinders under a desired threshold (e.g., 1%), the engine may be arranged with an uneven number of donor and non-donor cylinders, and may be specifically arranged with a number of non-donor cylinders that is not an integer multiple of the number of donor cylinders. In one example, as indicated at 506, routing exhaust from the donor cylinders may include routing exhaust from three donor cylinders.

At 508, method 500 includes routing exhaust gas from a non-donor cylinder group to atmosphere. In some examples, the exhaust from the non-donor cylinder group may be routed exclusively to atmosphere, meaning not routed to the intake. As indicated at 510, routing exhaust from the non-donor cylinders may include routing exhaust through a second exhaust manifold fluidically coupled to the non-donor cylinders and the atmosphere. The second exhaust manifold may be separate from the first exhaust manifold. Additionally, as indicated at 512, routing exhaust gas from the non-donor cylinders may include routing exhaust gas from five non-donor cylinders.

At 514, a mixture of fresh air and exhaust gas (from the donor cylinders) is routed to the cylinders for combustion, via an intake manifold fluidically coupled to the intake and to each cylinder of both the donor and non-donor cylinder groups. Due to the configuration of the donor and non-donor cylinders (e.g., three donor and five non-donor cylinders), the cylinder-to-cylinder variation in the amount of exhaust residuals in each cylinder during combustion may vary by less than a threshold amount, such as 1%, as indicated at 516. The exhaust residuals may include external EGR originating from the donor cylinders, as wells as in-cylinder exhaust that is trapped in the cylinders due to the intake and exhaust valve timing. In some embodiments, routing the mixture of fresh air and exhaust gas to the cylinders may include, at 518, routing the fresh air and/or exhaust gas through a damping volume positioned in the intake passage upstream of the intake manifold. As explained previously, the damping volume may dampen fluctuations in the amount of fresh air and/or exhaust gas delivered to the cylinders.

At 520, method 500 may include closing the exhaust valves of the non-donor cylinders earlier than the exhaust valves of the donor cylinders. In doing so, the amount of trapped EGR in the non-donor cylinders will increase compared to if the exhaust valves of the non-donor cylinders are closed with the same timing as the exhaust valves of the donor cylinders. By increasing the amount of trapped EGR in the non-donor cylinders, the amount of trapped EGR among all the cylinders will be less varied.

In an embodiment, a method for an engine comprises routing exhaust gas from a plurality of non-donor cylinders of the engine exclusively to atmosphere, routing recirculated exhaust gas from a plurality of donor cylinders of the engine to an engine intake, and delivering a mixture of fresh air and the recirculated exhaust gas for combustion in the plurality of non-donor cylinders and the plurality of donor cylinders. A cylinder-to-cylinder variation of exhaust residuals during combustion may be less than a designated threshold, and the exhaust residuals may comprise one or more of delivered recirculated exhaust gas (e.g., from the donor cylinders) and trapped exhaust gas (e.g., internal EGR).

In one example, the designated threshold of cylinder-to-cylinder variation of exhaust residuals is 1% or less. The engine may be an inline engine comprising eight cylinders, wherein routing the exhaust gas from the plurality of non-donor cylinders exclusively to atmosphere comprises routing exhaust gas from five non-donor cylinders exclusively to atmosphere, and wherein routing the recirculated exhaust gas from the plurality of donor cylinders to the engine intake comprises routing the recirculated exhaust gas from three donor cylinders to the engine intake.

Routing the recirculated exhaust gas from the plurality of donor cylinders to the intake may comprise routing the recirculated exhaust gas through a first exhaust manifold coupled to the plurality of donor cylinders, and routing the exhaust gas from the plurality of non-donor cylinders exclusively to atmosphere may comprise routing exhaust gas through a second exhaust manifold coupled to the plurality of non-donor cylinders.

Delivering the mixture of fresh air and the recirculated exhaust gas for combustion in the plurality of non-donor cylinders and the plurality of donor cylinders may comprise delivering the mixture of fresh air and the recirculated exhaust gas through a damping volume prior to reaching an intake manifold coupled to the plurality of non-donor cylinders and the plurality of donor cylinders. The damping volume may comprise a cylindrical expansion region of an intake passage upstream of the intake manifold. In one embodiment the damping volume may include a straight pipe with a volume of approximately 63 liters.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a first cylinder group of an engine having a first number of cylinders;
   a second cylinder group of the engine having a second number of cylinders that is not an integer multiple of the first number of cylinders;
   an exhaust system coupled to the first cylinder group and the second cylinder group, and in at least one mode of operation the exhaust system has exhaust ports of the first cylinder group fluidly coupled to an intake of the engine and exhaust ports of the second cylinder group fluidly decoupled from the intake; and
   a damping volume positioned in an intake passage of the intake downstream of each of a mixing point where exhaust gas from the first cylinder group mixes with fresh air and an exhaust gas recirculation cooler upstream of an intake manifold of the intake, the intake manifold fluidically coupled to each cylinder of the first cylinder group and each cylinder of the second cylinder group, the damping volume having a single inlet and a single outlet.

2. The system of claim 1, wherein the damping volume comprises an expansion region, a collection region, and a contraction region, where a first diameter of the collection region is larger than a second diameter of the expansion region and the second diameter of the expansion region is larger than a third diameter of the intake passage.

3. The system of claim 1, wherein the first number of cylinders is three cylinders, and wherein the second number of cylinders is five cylinders.

4. The system of claim 1, wherein the exhaust system comprises a first exhaust manifold coupled to the first cylinder group and a second exhaust manifold coupled to the second cylinder group, the first exhaust manifold fluidically coupled to the intake and the second exhaust manifold fluidically coupled to an exhaust.

5. The system of claim 1, further comprising the intake manifold fluidically coupled to the intake and to the first cylinder group and the second cylinder group.

6. The system of claim 1, wherein each cylinder of the first cylinder group and the second cylinder group includes a respective intake valve and a respective exhaust valve, and further comprising a variable camshaft timing system configured to set an opening timing and a closing timing of each respective intake valve and exhaust valve.

7. The system of claim 6, wherein the exhaust valve closing timing of each exhaust valve of the second cylinder group is earlier than the exhaust valve closing timing of each exhaust valve of the first cylinder group.

8. A vehicle, comprising:
a propulsion system for moving the vehicle; and
the system of claim 1, wherein the engine is coupled to the propulsion system for powering the propulsion system.

9. The system of claim 1, wherein the first number of cylinders and the second number of cylinders in combination comprise all the cylinders of the engine.

10. The system of claim 9, wherein the first number of cylinders is three cylinders, and wherein the second number of cylinders is five cylinders.

11. A method for an engine, comprising:
routing exhaust gas from a plurality of non-donor cylinders of the engine exclusively to atmosphere;
routing recirculated exhaust gas from a plurality of donor cylinders of the engine to an engine intake; and
delivering a mixture of fresh air and the recirculated exhaust gas for combustion in the plurality of non-donor cylinders and the plurality of donor cylinders, including delivering the mixture of fresh and the recirculated exhaust gas through a damping volume prior to reaching an intake manifold coupled to the plurality of non-donor cylinders and the plurality of donor cylinders, the damping volume comprising a cylindrical expansion region of an intake passage upstream of the intake manifold, a cylinder-to-cylinder variation of exhaust residuals during combustion being less than a designated threshold, the exhaust residuals comprising one or more of delivered recirculated exhaust gas or trapped exhaust gas.

12. The method of claim 11, wherein the designated threshold of cylinder-to-cylinder variation of exhaust residuals is 1% or less.

13. The method of claim 12, wherein the engine is an inline engine comprising eight cylinders, wherein routing the exhaust gas from the plurality of non-donor cylinders exclusively to atmosphere comprises routing exhaust gas from five non-donor cylinders exclusively to atmosphere, and wherein routing the recirculated exhaust gas from the plurality of donor cylinders to the engine intake comprises routing the recirculated exhaust gas from three donor cylinders to the engine intake.

14. The method of claim 13, wherein routing the recirculated exhaust gas from the plurality of donor cylinders to the engine intake comprises routing the recirculated exhaust gas through a first exhaust manifold coupled to the plurality of donor cylinders, and wherein routing the exhaust gas from the plurality of non-donor cylinders exclusively to atmosphere comprises routing exhaust gas through a second exhaust manifold coupled to the plurality of non-donor cylinders.

15. The method of claim 13, wherein delivering the mixture of fresh air and the recirculated exhaust gas through the damping volume comprises delivering the mixture through a single inlet of the damping volume and out a single outlet of the damping volume.

16. A system, comprising:
a first cylinder group of an engine having a first number of cylinders;
a second cylinder group of the engine having a second number of cylinders that is not an integer multiple of the first number of cylinders; and
a damping volume positioned in an intake passage of an intake downstream of a mixing point where exhaust gas from the first cylinder group mixes with fresh air and upstream of an intake manifold of the intake of the engine, the intake manifold fluidically coupled to each cylinder of the first cylinder group and each cylinder of the second cylinder group, the damping volume having a single inlet and a single outlet,
wherein the damping volume comprises an expansion region, a collection region, and a contraction region, where a first diameter of the collection region is larger than a second diameter of the expansion region and the second diameter of the expansion region is larger than a third diameter of the intake passage.

* * * * *